United States Patent
Amanullah et al.

(10) Patent No.: US 8,563,479 B2
(45) Date of Patent: Oct. 22, 2013

(54) VOLCANIC ASH-BASED DRILLING MUD TO OVERCOME DRILLING CHALLENGES

(75) Inventors: Md. Amanullah, Dhahran (SA); Abdulaziz S. Bubshait, Dhahran (SA); Omar A. Fuwaires, Dhahran (SA)

(73) Assignee: Saudi Arabian Oil Company (SA)

( * ) Notice: Subject to any disclaimer, the term of this patent is extended or adjusted under 35 U.S.C. 154(b) by 128 days.

(21) Appl. No.: 12/939,032

(22) Filed: Nov. 3, 2010

(65) Prior Publication Data

US 2012/0108471 A1    May 3, 2012

(51) Int. Cl.
*C09K 8/20* (2006.01)
*C09K 8/08* (2006.01)
*C09K 8/035* (2006.01)
*C09K 8/00* (2006.01)

(52) U.S. Cl.
USPC ............ 507/104; 507/110; 507/111; 507/140

(58) Field of Classification Search
USPC .................................. 507/104, 110, 111, 140
See application file for complete search history.

(56) References Cited

U.S. PATENT DOCUMENTS

| | | | |
|---|---|---|---|
| 2,206,677 A | 7/1940 | Shepler | |
| 2,209,591 A | 7/1940 | Barnes | |
| 2,265,773 A | 12/1941 | Larkin | |
| 2,793,995 A | 5/1957 | Twining | |
| 3,264,125 A * | 8/1966 | Bourlin et al. | 106/609 |
| 3,557,876 A | 1/1971 | Tragesser | |
| 3,866,683 A | 2/1975 | Maly et al. | |
| 4,561,985 A | 12/1985 | Glass, Jr. | |
| 5,711,383 A | 1/1998 | Terry et al. | |
| 6,182,758 B1 * | 2/2001 | Vijn | 166/293 |
| 6,258,756 B1 | 7/2001 | Hayatdavoudi | |
| 6,910,537 B2 | 6/2005 | Brown et al. | |

FOREIGN PATENT DOCUMENTS

| | | |
|---|---|---|
| EP | 1348751 A1 | 10/2003 |
| JP | 2003013061 A | 1/2003 |
| JP | 2007126558 A | 5/2007 |
| WO | 2008033273 A1 | 3/2008 |

OTHER PUBLICATIONS

International Search Report and Written Opinion issued in PCT/US2011/057992, dated May 2, 2012 (10 pages).
Al-Homadhi E.: "Improving Local Bentonite Performance for Drilling Fluids Application", SPE 110951, May 7, 2007, pp. 1-8, XP007920525.
English Patent Abstract of JP2007126558, Published May 24, 2007 (1 page).
English Patent Abstract of JP2003013061, Published Jan. 15, 2003 (1 page).
Written Opinion issued in PCT/US2011/057992 dated Oct. 29, 2012 (6 pages).

* cited by examiner

*Primary Examiner* — Ling-siu Choi
*Assistant Examiner* — Aiqun Li
(74) *Attorney, Agent, or Firm* — Bracewell & Giuliani LLP

(57) ABSTRACT

Drilling mud compositions and related methods are provided as embodiments of the present invention. The drilling mud compositions are water-based and contain volcanic ash. The compositions and methods of the present invention provide improved properties relative to tolerance of high salt content, cement, lime, and temperatures.

25 Claims, No Drawings

VOLCANIC ASH-BASED DRILLING MUD TO OVERCOME DRILLING CHALLENGES

BACKGROUND OF THE INVENTION

1. Field of the Invention

Disclosed herein are water-based drilling mud compositions containing volcanic ash and related methods.

2. Description of the Related Art

Traditionally bentonite or extended bentonite is used as a drilling mud additive in the oil and gas, geothermal, and water well drilling industries for hole cleaning, cuttings suspension, formation support, and the like while drilling. The bentonite clays are known to swell significantly when contacted with water and accordingly are used to produce viscous properties and fluid loss control in water-based mud systems. The bentonite materials are generally dispersed or suspended in fresh water by mixing it properly or occasionally in salt water if pre-hydrated with fresh water before being added to salt water. Ingredients such as gelling or thickening agents or fluid loss additives are sometimes incorporated into the bentonite mud composition to enhance its viscous, gelling, and fluid loss properties.

The bentonite clay that is used in many prior art applications could be the high swelling or the poorly-swelling types, depending on the availability of the material. However, enhancement or extension of poor quality bentonite is usually done using some polymers known as bentonite extenders. Due to high swelling properties of bentonites, good viscosity building capability with fresh water, ease of formulation and easy availability of bentonite material in the global market, environment friendliness of bentonites and bentonite-based muds, it is a common drilling mud that is widely used as in spud and surface hole drilling mud systems. Bentonite mud is also used to drill the non-reservoir section of the surface hole ranging from a couple of hundred feet to more than a thousand feet.

Conventional bentonite mud, though widely used for surface hole drilling, has serious technical limitations due to poor tolerance to monovalent and divalent salts, undesirable mud solids, cement contamination, pH changes, and temperature changes above 100° C. This type of mud system also has strong interactions with subsurface formations such as anhydrite, evaporite, salt diapirs, clay rich formations, reactive shale, marls, and the like. As salt cannot be used to inhibit the reactive fresh water phase of the bentonite mud, it creates serious borehole problems in drilling evaporite, anhydrite, and reactive shales that are frequently encountered in many fields. Due to the high dissolution capacity of fresh water used in bentonite mud formulations, it often leads to hole enlargement and loss of circulation problems while drilling shales, evaporites, and anhydrites. The bentonite mud triggered borehole problems can lead to the set up of an unplanned casing string with a significant increase in total well costs and may also lead to a poor cementation job leading to a remedial action for a correction.

However, due to serious technical limitations of the bentonite muds, they are ineffective in drilling evaporite, anhydrite, clay rich, and salty formations in many fields. Other problems that exist when using prior art bentonite mud systems can include poor salt, saline water, solids, and cement tolerance, along with high sensitivity to pH and temperature changes. Many prior art bentonite mud are not tolerant to monovalent and divalent salts; have poor thermal and chemical stability; have little to no cement and poor solids tolerance; and are incompatible to drill anhydrite, evaporite, clays, marls, reactive shale, salt diapirs, and the like.

A need exists for mud compositions that have monovalent and divalent salt tolerance, cement tolerance, high chemical stability in a wide pH range, good thermal stability to prevent thermally induced thickening, good mudcake building properties, low fluid loss potential, and the like. It would be advantageous for the mud system to also have the potential to maintain a good borehole profile in drilling evaporite, anhydrite, and reactive shale formations to overcome the drilling challenges that are encountered while drilling the top sections of a wellbore and also the total non-reservoir section of a borehole.

SUMMARY OF THE INVENTION

In view of the foregoing, drilling mud compositions and related methods are provided as embodiments of the present invention. The drilling mud compositions contain volcanic ash and provide improved properties relative to tolerance of high salt content, cement, lime, and high temperatures.

For example, as an embodiment of the present invention, a water-based drilling mud composition with improved properties relative to tolerance of high salt content, cement, lime, and temperatures is provided. In this embodiment, the composition includes volcanic ash, water, a viscosifier, a pH buffer, and a bi-functional mud additive. The viscosifier is present in an amount sufficient to provide sufficient viscous properties for the composition. The pH buffer is present in an amount sufficient to maintain a pH of the composition in a predetermined pH range.

As an embodiment of the present invention, another water-based drilling mud composition with improved properties relative to tolerance of high salt content, cement, lime, and temperatures is provided. In this embodiment, the composition includes volcanic ash, water, a viscosifier, a pH buffer, and a bi-functional mud additive. The volcanic ash includes silica, aluminum oxide, lime, ferric oxide, and magnesium oxide. The viscosifier is present in an amount sufficient to provide sufficient viscous properties for the composition. The pH buffer is present in an amount sufficient to maintain a pH of the composition in a predetermined pH range. The bi-functional mud additive is chemically non-reactive with the volcanic ash.

Besides the compositional embodiments, methods of preparing the compositions and treating a well bore using the compositions are provided as embodiments of the present invention. For example, as an embodiment, a method of preparing a water-based drilling mud composition is provided. In this embodiment, water is mixed with volcanic ash, a viscosifier, a pH buffer, and a bi-functional mud additive to produce the water-based drilling mud composition.

As another embodiment of the present invention, a method of treating a well bore is provided. In this embodiment, the method includes providing a drilling fluid comprising a volcanic ash, a viscosifier, a pH buffer, and a bi-functional mud additive; and placing at least a portion of the drilling fluid into the well bore.

DETAILED DESCRIPTION OF THE DISCLOSURE

Drilling mud compositions and related methods are provided as embodiments of the present invention. The drilling mud compositions contain volcanic ash and provide improved properties relative to tolerance of high salt content, cement, lime, and high temperatures.

For example, as an embodiment of the present invention, a water-based drilling mud composition with improved properties relative to tolerance of high salt content, cement, lime, and high temperatures is provided. In this embodiment, the composition includes volcanic ash, water, a viscosifier, a pH buffer, and a bi-functional mud additive. A bi-function mud additive is an additive that performs two functions at the same time. The bi-functional additive used in embodiments of the present invention acts as a viscosity enhancer, i.e., as a secondary viscosifier, and also as a fluid loss additive. The viscosifier is present in an amount sufficient to provide sufficient viscous properties for the composition. The pH buffer is present in an amount sufficient to maintain a pH of the composition in a predetermined pH range.

As an embodiment of the present invention, another water-based drilling mud composition with improved properties relative to tolerance of high salt content, cement, lime, and temperatures is provided. In this embodiment, the composition includes volcanic ash, water, a viscosifier, a pH buffer, and a bi-functional mud additive. The volcanic ash includes silica, aluminum oxide, lime, ferric oxide, and magnesium oxide. The viscosifier is present in an amount sufficient to provide sufficient viscous properties for the composition. The pH buffer is present in an amount sufficient to maintain a pH of the composition in a predetermined pH range. The bi-functional mud additive is chemically non-reactive with the volcanic ash.

Besides the compositional embodiments, methods of preparing the compositions and treating a well bore using the compositions are provided as embodiments of the present invention. For example, as an embodiment, a method of preparing a water-based drilling mud composition is provided. In this embodiment, water is mixed with volcanic ash, a viscosifier, a pH buffer, and a bi-functional mud additive to produce the water-based drilling mud composition.

As another embodiment of the present invention, a method of treating a well bore is provided. In this embodiment, the method includes providing a drilling fluid comprising a volcanic ash, a viscosifier, a pH buffer, and a bi-functional mud additive; and placing at least a portion of the drilling fluid into the well bore.

The types and proportions of the various mud components used in embodiments of the present invention were selected based on several technical and environmental considerations. To obtain the desired mud properties, a range of values of the viscosifier and the bi-functional additive were evaluated to select the most suitable value or range of values for this invention. The amount of the viscosifiers can be varied within a narrow range in the vicinity of the optimum values described herein. The proportion of the volcanic ash in the mud compositions of the present invention can also be varied by appropriate adjustment of other mud additives. It was found that by changing the ratio of single functional viscosifier and the bifunctional additive from about 1:1 to about 1:2, one would be able to produce a low or high viscosity drilling mud system to fulfill certain drilling conditions.

In embodiments of the present invention, as previously indicated, the amounts of the components contained within the drilling fluid or mud can vary. For example, the volcanic ash can be present in a range of about 5 wt. % to about 8 wt. % of the composition. In an embodiment, the percentage of volcanic ash that can be used is about 5.35%. The water can be present in an amount greater than about 90 wt. % of the composition. In an aspect, the percentage of water that can be used in mud composition formulations is 93.6 wt. %. The viscosifier can be present in a range of about 0.3 wt. % to about 0.8 wt. %. In an aspect, the viscosifier can be present in an amount of about 0.535 wt. %, particularly when the viscosifier includes XC polymer. The bi-functional mud additive can be present in a range of about 0.5% (w/w) to about 1% (w/w) of the composition. Other suitable amounts of each component will be apparent to those of skill in the art and are to be considered within the scope of the present invention.

Volcanic ash is included in embodiments of the present invention. The components and amounts of each component contained in the volcanic ash can vary, particularly depending upon the source of the volcanic ash. A typical volcanic ash can include silica, aluminum oxide, lime, ferric oxide, and magnesium oxide. In an aspect, the volcanic ash can include about 45.7 wt. % silica, about 15 wt. % aluminum hydroxide, about 9 wt. % lime, about 12 wt. % ferric oxide, and about 8 wt. % magnesium oxide. Other suitable components and the amounts of each component will be apparent to those of skill in the art and are to be considered within the scope of the present invention.

Volcanic ash predominantly consists of silica, aluminum oxide, lime (calcium oxide), ferric and magnesium oxides and can be found all over the world. Volcanic ash is substantially different from other types of ash, such as fly ash, which primarily contains silicon dioxide and lime. There can be some variations in the composition of the volcanic ash depending on the locality, area and country of deposition. Any suitable local volcanic ash composition can be used in the embodiments of the present invention. However, the concentration of the additives may need to be adjusted to develop the necessary mud properties, as will be understood by those of skill in the art.

The manufacturing of the volcanic ash of this invention is relatively simple. The desired size range of the particles can be achieved by using any commercial grinder having a programmable predefined particle size distribution profile. In an aspect, the volcanic ash has an average particle size distribution that ranges from about 20 micron to about 100 micron. Formulation of the mud compositions of the present invention can be prepared at room temperature using cold water. No heating of any of the ingredients is needed to produce a viable mud formulation in accordance with embodiments of the present invention.

The drilling fluids of the present invention are water-based. The source of the water used to make the drilling fluid compositions of the present invention can vary. For example, the water can be fresh water, sea water, salt water, formation brine, or combinations thereof. Other suitable sources of water will be apparent to those of skill in the art and are to be considered within the scope of the present invention.

The properties of the bi-functional mud additive can vary, depending upon the application in which the drilling mud is being used. In some applications, the particle size can be important. In an aspect, the bi-functional mud additive has a particle size distribution of less than about 100 micron. In some applications, it is desirable for the bi-functional mud additive to be chemically non-reactive with the volcanic ash. In other applications, it is desirable for the bi-functional mud additive to be capable of physically binding to the volcanic ash.

Various types of compounds can be used as the bi-functional or bifurcation mud additive. For example, the bi-functional mud additive can include psyllium husk, hydroxyprophylated starch, aribonose, xylose, or combinations thereof. Other suitable compounds that can be used as the bi-functional mud additive will be apparent to those of skill in the art and are to be considered within the scope of the present invention.

In aspect, when the bi-functional additive includes psyllium husk, the psyllium husk can be present in an amount that range from about 0.5 wt. % to about 1 wt. %. In an aspect, the psyllium husk can be present in an amount of about 0.535 wt. %. The psyllium husk can be present in an amount that is effect to enhance the viscous properties of the mud composition and for controlling the fluid loss behavior of the mud composition. The psyllium husk can be used to enhance the rheological properties of the mud compositions along with the filtration control behavior of the mud compositions of the present invention. Suitable amounts of the psyllium husk useful in embodiments of the present invention will be apparent to those of skill in the art and are to be considered within the scope of the present invention.

Various types of compounds can be used as the viscosifier in embodiments of the present invention. For example, the viscosifier can include XC polymer, a water-swellable viscosifier, polyacrylamide, polyanionic cellulose, or combinations thereof. In an aspect, the viscosifier can include XC polymer as the single functional viscosifier for generating desirable viscous properties in the mud system. In an aspect, when the single functional viscosifier is the XC polymer, the viscosifier can be used to generate the required rheological and gelling properties in the mud compositions. In an aspect, the viscosifier can be a water-swellable viscosifier. Other suitable types of compounds that can be used as viscosifiers in embodiments of the present invention will be apparent to those of skill in the art and are to be considered within the scope of the present invention.

In some applications, it is desirable to maintain the viscosity of the composition within a predetermined range. In an aspect, the viscosifier can maintain a viscosity of the composition in a range of about 8 cP to about 30 cP. Other suitable viscosity ranges will be apparent to those of skill in the art and are to be considered within the scope of the present invention.

In some applications, it is desirable to maintain the pH of the composition within a predetermined range to prevent the development of reactive shale, clays, marles, and other water sensitive formations. In an aspect, the pH buffer can maintain a pH of the composition that ranges from about 9 to about 10.5; or alternatively, from about 9.5 to about 10. Various types of pH buffers can be used in embodiments of the present invention. For example, in an aspect, the pH buffer can include sodium hydroxide, potassium hydroxide, lime, or combinations thereof. The sodium hydroxide can be a 5N sodium hydroxide. In an aspect, when the pH buffer is a 5N sodium hydroxide, the alkaline material keeps the mud composition in an alkaline range to minimize the corrosive effect of the mud composition on steel tubulars, tanks, pumps, and the like. Other suitable pH ranges and types of pH buffers will be apparent to those of skill in the art and are to be considered within the scope of the present invention.

In aspect, when the pH buffer includes sodium hydroxide, the sodium hydroxide can be present in an amount that ranges from about 2 cc to about 2.5 cc; or alternatively, about 2 cc. In an aspect, the sodium hydroxide can be present in an amount effective to maintain a pH range of about 9.5 to about 10 for the mud composition.

Embodiments of the present invention have a high tolerance to various contaminants or conditions that would be detrimental to most prior art water-based mud composition formulations. For example, in an aspect, the mud composition of the present invention remains stable for a wide range of pH values with negligible or no changes in the rheological, filtration, and mudcake building properties. In an aspect, the pH values can range between about 7 to about 12 with no major changes in the rheological or filtration behavior of the mud compositions.

In an aspect, the mud composition of the present invention remains stable for a wide range of solids content with negligible or no changes in the rheological, filtration, and mudcake building properties. In an aspect, the solids content value can range between about 1 ppb to about 25 ppb with no major changes in the rheological or filtration behavior of the mud compositions.

In an aspect, the mud composition of the present invention remains stable for a wide range of monovalent salt contamination with negligible or no changes in the rheological, filtration, and mudcake building properties. In an aspect, the monovalent salt content can range between about 0 ppb to about 25 ppb with no major changes in the rheological or filtration behavior of the mud compositions.

In an aspect, the mud composition of the present invention remains stable for a wide range of divalent salt contamination with negligible or no changes in the rheological, filtration, and mudcake building properties. In an aspect, the divalent salt content can range between about 1 ppb to about 25 ppb with no major changes in the rheological or filtration behavior of the mud compositions.

In an aspect, the mud composition of the present invention remains stable for a wide range of cement contamination with negligible or no changes in the theological, filtration, and mudcake building properties. In an aspect, the cement content can range between about 0 ppb to about 30 ppb with no major changes in the rheological or filtration behavior of the mud compositions.

In an aspect, the mud composition of the present invention remains stable for a wide range of temperatures with negligible or no changes in the rheological, filtration, and mudcake building properties. In an aspect, the temperature can range between about 20° C. to about 100° C. with no major changes in the rheological or filtration behavior of the mud compositions.

Besides the pH buffer, viscosifier, and the bi-functional mud additive, other types of mud additives can be used in embodiments of the present invention, such as potassium chloride as an inhibitor. Other suitable additives that can be used in embodiments of the present invention include crosslinking agents, biocides, breakers, buffers, surfactants, non-emulsifiers, stabilizers, fluid loss additives, foamers, friction reducers, and the like or combinations thereof, as needed. Other suitable types of additives that can be used in embodiments of the present invention will be apparent to those of skill in the art and are to be considered within the scope of the present invention.

Various methods can be used to produce the mud composition formulations of the present invention. In an aspect, the micro sized volcanic ash particles, aided by the viscosifier and the bi-functional additive, are suspended substantially uniformly in the mud system by means of a high speed mixer such as the Hamilton Beach mixer. The combined action of the single and bi-functional additives used in this formulation allows keeping the particles suspended for a long time (more than 2 weeks) and thus enhances the long term stability of the mud compositions of the present invention along with all other mud properties. The concentration of the viscosifier and the bi-functional additive in the mud compositions of the present invention can range from about 0.5% (w/w) to about 1% (w/w) of the mud system to obtain desirable mud properties. Other suitable manners in which to create the suspended substantially uniform mud system will be apparent to those of skill in the art and are to be considered within the scope of the present invention.

Embodiments of the present invention provide several advantages when compared with prior art bentonite-based mud systems. The compositions and related methods of the present invention are accomplished using a predominantly natural additive-based drilling mud composition that has similar or better environmental attributes compared to the bentonite mud systems. The compositions and methods of the present invention provide a functionally viable mud composition using locally available natural products, such as volcanic ash. The embodiments of the present invention provide a relatively easy formulation that is easy to maintain and free to dispose in the vicinity of a rig operation.

As another advantage of the present invention, embodiments of the present invention include a mud composition that will allow incorporating potassium chloride and other type of inhibitors in the mud system without causing any changes to the mud properties to provide inhibition to reactive shale, clays, marls and other water sensitive formations.

Another advantage of the present invention is that embodiments of the present invention provide a mud composition that will cause no dissolution of salt diapers, evaporate, and anhydrite formations that are encountered in many fields frequently.

Other advantages include that embodiments of the present invention provide a mud composition that has a relatively high tolerance to mud solids to prevent any major changes of the rheological and filtration properties of the mud. A still further advantage of embodiments of the present invention is that they provide a mud composition that has a relatively high tolerance to monovalent and divalent salts to prevent any major changes of the rheological, gel strength, filtration, and mudcake building properties to the mud composition.

Additional advantages are that the mud composition embodiments of the present invention have a relatively high tolerance to cement contamination to prevent any major changes of the rheological, gel strength, filtration and mudcake building properties to the mud composition. Embodiments of the mud composition have a relatively high thermal stability (up to 100° C.) to prevent any major changes of the rheological, gel strength, filtration and mudcake building properties to the mud system. Embodiments of the mud composition have low API and HTHP fluid loss and allow the deposition of a well dispersed and thin mudcake on the borehole wall to reduce the scope of differential sticking in highly permeable formations.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. A water-based drilling mud composition with improved properties relative to tolerance of high salt content, cement, lime, and temperatures, the composition comprising:
   a. volcanic ash;
   b. water;
   c. a viscosifier, the viscosifier being present in an amount that ranges from about 0.3 wt. % to about 0.8 wt. % of the composition;
   d. a pH buffer, the pH buffer maintains a pH of the composition that ranges from 9 to 10.5; and
   e. a bi-functional mud additive, the composition consisting of up to about 25 pounds per barrel of monovalent salt, divalent salt, or a combination thereof with negligible or no changes in rheology or filtration behavior of the composition
   wherein the volcanic ash is present in a range of about 5 wt. % to about 8 wt. % of the composition; the water is present in an amount greater than about 90 wt. %; and the bi-functional mud additive is present in a range of about 0.5% (w/w) to about 1% (w/w) of the composition.

2. The composition of claim 1, wherein the volcanic ash comprises silica, aluminum oxide, lime, ferric oxide, and magnesium oxide.

3. The composition of claim 1, wherein the water is fresh water, sea water, salt water, formation brine, or combinations thereof.

4. The composition of claim 1, wherein the bi-functional mud additive has a particle size distribution of less than about 100 micron.

5. The composition of claim 1, wherein the pH buffer comprises sodium hydroxide, potassium hydroxide, lime, or combinations thereof.

6. The composition of claim 1, wherein the bi-functional mud additive is chemically non-reactive with the volcanic ash.

7. The composition of claim 1, wherein the bi-functional mud additive is capable of physically binding to the volcanic ash.

8. The composition of claim 1, wherein the bi-functional mud additive comprises psyllium husk, hydroxypropylated starch, aribonose, xylose, or combinations thereof.

9. The composition of claim 1, wherein the composition has a viscosity that ranges from about 8 cP to about 30 cP.

10. A water-based drilling mud composition with improved properties relative to tolerance of high salt content, cement, lime, and temperatures, the composition comprising:
   a. volcanic ash, the volcanic ash comprising silica, aluminum oxide, lime, ferric oxide, and magnesium oxide;
   b. water;
   c. a viscosifier, the viscosifier being present in an amount that ranges from about 0.3 wt. % to about 0.8 wt. % of the composition;
   d. a pH buffer, the pH buffer maintains a pH of the composition that ranges from 9 to 10.5; and
   e. a bi-functional mud additive, the bi-functional mud additive being chemically non-reactive with the volcanic ash, the composition consisting of up to about 25 pounds per barrel of monovalent salt, divalent salt, or a combination thereof with negligible or no changes in rheology or filtration behavior of the composition,
   wherein the volcanic ash is present in a range of about 5 wt. % to about 8 wt. % of the composition; the water is present in an amount greater than about 90 wt. %; and the bi-functional mud additive is present in a range of about 0.5% (w/w) to about 1% (w/w) of the composition.

11. The composition of claim 10, wherein the water is fresh water, sea water, salt water, formation brine, or combinations thereof.

12. The composition of claim 10, wherein the bi-functional mud additive has a particle size distribution of less than about 100 micron.

13. The composition of claim 10, wherein the pH buffer comprises sodium hydroxide.

14. The composition of claim 10, wherein the bi-functional mud additive is capable of physically binding to the volcanic ash.

15. The composition of claim 10, wherein the bi-functional mud additive comprises psyllium husk, hydroxypropylated starch, aribonose, xylose, or combinations thereof.

16. The composition of claim 10, wherein the composition has a viscosity that ranges from about 8 cP to about 30 cP.

17. A method of preparing a water-based drilling mud compositions comprising mixing water with volcanic ash; a viscosifier present in an amount that ranges from about 0.3 wt. % to about 0.8 wt. % of the composition; a pH buffer that maintains a pH of the composition that ranges from 9 to 10.5; and a bi-functional mud additive to produce the water-based drilling mud composition, the composition consisting of up to about 25 pounds per barrel of monovalent salt, divalent salt, or a combination thereof with negligible or no change in rheology or filtration behavior of the composition, wherein the volcanic ash is present in a range of about 5 wt. % to about 8 wt. % of the composition; the water is present in an amount greater than about 90 wt. %; and the bi-functional mud additive is present in a range of about 0.5% (w/w) to about 1% (w/w) of the composition.

18. The method of claim 17, wherein the volcanic ash comprises silica, aluminum oxide, lime, ferric oxide, and magnesium oxide.

19. The method of claim 17, wherein the water is fresh water, sea water, salt water, formation brine, or combinations thereof.

20. The method of claim 17, wherein the bi-functional mud additive has a particle size distribution of less than about 100 micron.

21. The method of claim 17, wherein the pH buffer comprises sodium hydroxide.

22. The method of claim 17, wherein the bi-functional mud additive is chemically non-reactive with the volcanic ash.

23. The method of claim 17, wherein the bi-functional mud additive is capable of physically binding to the volcanic ash.

24. The method of claim 17, wherein the bi-functional mud additive comprises psyllium husk, hydroxypropylated starch, aribonose, xylose, or combinations thereof.

25. The method of claim 17, wherein the viscosity of the composition ranges from about 8 cP to about 30 cP.

* * * * *